United States Patent [19]

Armstrong

[11] 4,317,266

[45] Mar. 2, 1982

[54] THRUST BEARING ASSEMBLY METHOD

[75] Inventor: John T. Armstrong, Avenel, N.J.

[73] Assignee: General Motors Corporation, Detroit, Mich.

[21] Appl. No.: 168,465

[22] Filed: Jul. 10, 1980

[51] Int. Cl.³ ............................................. B21D 53/10
[52] U.S. Cl. ........................... 29/148.4 A; 29/148.4 C; 29/DIG. 3; 308/236
[58] Field of Search .................. 29/148.4 C, 148.4 A, 29/148.4 R, DIG. 3; 113/117; 308/235, 217, 201, 218, 216, 236, DIG. 11

[56]  References Cited

U.S. PATENT DOCUMENTS

| | | | |
|---|---|---|---|
| 1,736,959 | 11/1929 | Gibbons | 29/148.4 A |
| 3,230,605 | 1/1966 | Schaeffler | 29/148.4 |
| 3,937,541 | 2/1976 | Alling et al. | 29/148.4 A |
| 3,981,060 | 9/1976 | Alling et al. | 29/148.4 C |
| 4,042,285 | 8/1977 | Dorsch | 308/235 |

Primary Examiner—Francis S. Husar
Assistant Examiner—V. K. Rising
Attorney, Agent, or Firm—Patrick M. Griffin

[57]  ABSTRACT

A method for final assembly of a thrust bearing of the type including an annular roller cage retained within an annular thrust race by means of preformed rigid projections on an outer flange of the thrust race which extend over an outer rim of the roller cage, whereby the roller cage is assembled within the rigid projections by controlled elastic deformation of the parts without any deformation of the rigid projections themselves being necessary.

2 Claims, 5 Drawing Figures

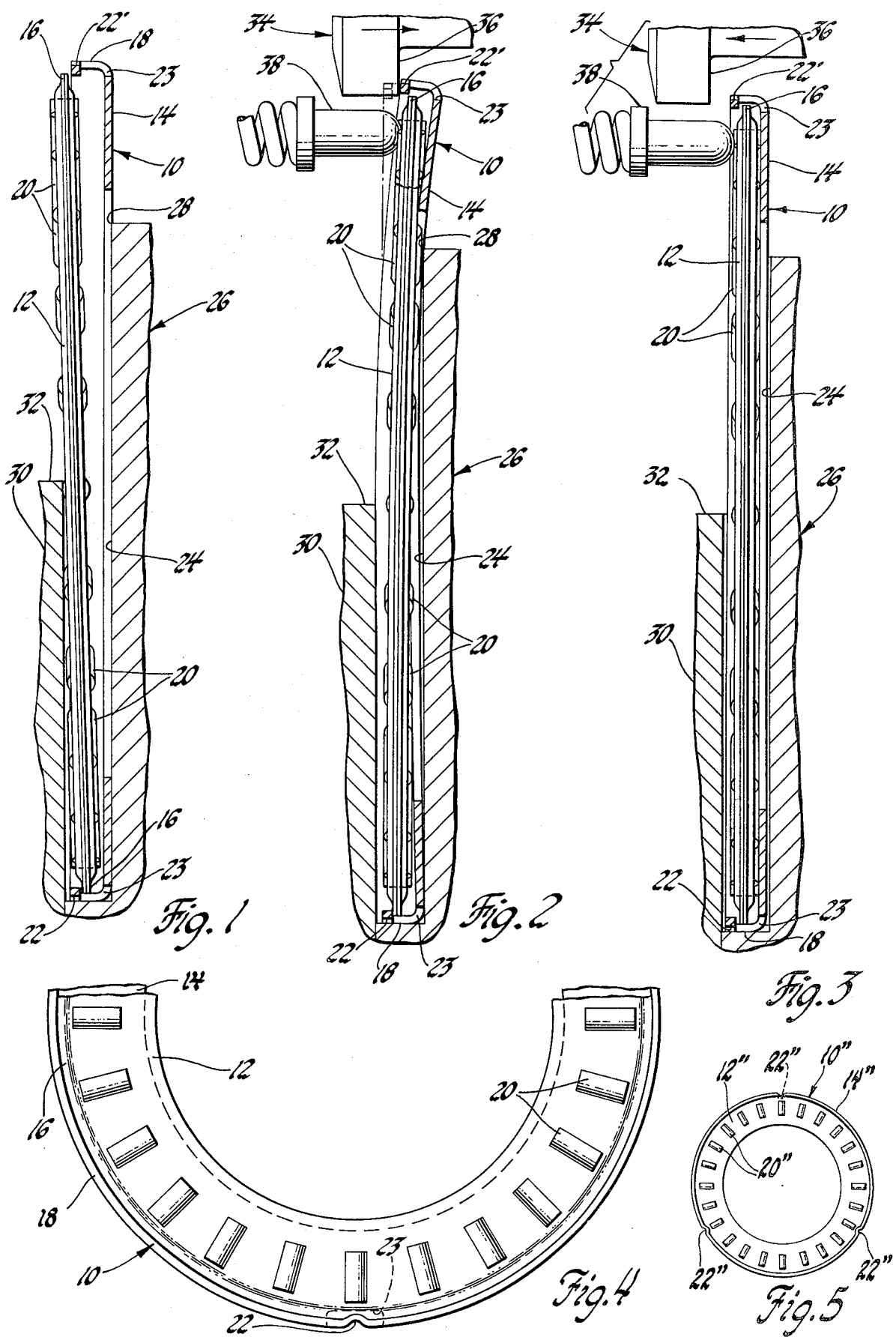

THRUST BEARING ASSEMBLY METHOD

BACKGROUND OF THE INVENTION

This invention relates to a method for assembling an annular roller cage within a flanged thrust race of a thrust bearing, and more particularly to such a method wherein the roller cage is assembled within preformed rigid retaining projections of the race without either damage to the projections or inelastic deformation of the roller cage.

DESCRIPTION OF THE PRIOR ART

Thrust bearings of the relevant type are known and commonly include an annular roller cage containing a plurality of cylindrical rollers. The cage is rotatably retained within a flanged annular thrust race by fingers on a flange of the race. U.S. Pat. No. 4,042,285 Dorsch discloses flexible projections on the inner axial flange of the thrust race to allow the roller cage to be snapped over the projections which then retain it.

SUMMARY OF THE INVENTION

In the method of this invention, the roller cage is retained within the thrust race by radially extending retaining projections which are rigid and are formed on the axially outer flange of the race prior to the final assembly of the cage within the race. It is required that the roller cage be assembled within the thrust race and within the rigid projections without damaging or deforming the projections or the cage. The method of this invention may be used with roller cages having two or three symmetrically disposed projections.

In the assembly method of this invention, one portion of the outer rim of the roller cage is seated inwardly or to one side of all but one of the projections on the outer flange of the thrust race to partially assemble the bearing. A diametrically opposed other portion of the rim of the roller cage is located outwardly of the other projection and rests thereagainst. The partially assembled portions of the roller cage and thrust race are then placed within a slot in a rigid die. The unassembled portions of the roller cage and thrust race extend out of the die slot and past a straight line edge of the die which defines a rigid fulcrum orthogonal to the other projection of the thrust race. The unassembled portion of the thrust race is then engaged near the other projection and elastically deformed about the fulcrum away from the roller cage to move the other projection axially and radially outwardly of its original position and out of the path of the other portion of the rim of the roller cage. During deformation of the thrust race or thereafter the roller cage is moved inwardly or toward the thrust race to locate the other portion of the rim of the roller cage to the one side of the original position of the other projection. When the thrust race is allowed to self-straighten, the other projection returns to its original position to enclose the other portion of the rim of the roller cage and complete the assembly of the thrust bearing. The deformation of the thrust race is within the elastic limit thereof, so that there is no damage.

The primary feature of this invention is that it provides an improved method of assembling an annular roller cage within preformed rigid retaining projections of a flanged thrust race without damage to the projections, the race or the roller cage. Another feature of this invention is that it provides such a method wherein the rigid retaining projections are symmetrically disposed about the axially outer flange of the thrust race.

BRIEF DESCRIPTION OF THE DRAWINGS

These and other objects of the invention will appear from the following description and the accompanying drawing in which:

FIG. 1 is a sectional view showing a pre-assembled roller cage and two projection thrust race within a die;

FIG. 2 is a similar view showing the thrust race being elastically deformed;

FIG. 3 is a similar view showing the roller cage assembled within the thrust race;

FIG. 4 shows a portion of an assembled two projection thrust bearing; and

FIG. 5 shows an assembled roller cage and three projection thrust race.

DESCRIPTION OF THE PREFERRED EMBODIMENTS

Referring first to FIG. 4, a portion of a thrust bearing designated generally at 10 includes an annular roller cage 12 contained within thrust race 14. Roller cage 12 has an outer circular rim 16 of a diameter slightly less than that of an outer axial flange 18 of thrust race 14 so as to freely rotate therewithin. Roller cage 12 is conventional and contains a plurality of cylindrical rollers 20. Outer axial flange 18 includes two diametrically opposed or symmetrically disposed radially inwardly directed projections 22, only one of which is shown in FIG. 4.

Projections 22 extend radially inwardly over the outer circular rim 16 of roller cage 12 and serve to retain it for rotation within race 14. Each projection 22 need not be a single projection, but can be a group of closely adjacent projections, with such groups being symmetrically disposed about flange 18. The projections 22 are formed in the thrust race 14 during its manufacture by punching out portions 23 of the body and flange 20 of race 14 and forming the projection 22 in the remaining portion of the flange 18 in conventional fashion. The projections 22 are formed during manufacture of thrust race 14 and are rigid in both radial and axial directions. It is desirable, therefore, to avoid a "snap" fit which could damage the projections 22 of flange 18. The method of this invention permits assembly without any such damage.

Referring now to FIG. 1, roller cage 12 and thrust race 14 are partially assembled by placing one portion of rim 16 of roller cage 12 inside one of the projections 22.

The relative diameters of roller cage 12 and thrust race 14 are such that the diametrically opposite other portion of the rim 16 is located outwardly of the one other projection 22' and rests thereagainst. The partially assembled portions of the roller cage 12 and thrust race 14 are then placed within a semicircular slot 24 in rigid die 26. The unassembled portions of the cage and race project outwardly of the slot. Thrust race 14 rests against a straight line upper edge portion 28 of one wall of the die 26. The assembly is placed so that a straight line from the other projection 22' is approximately perpendicular to upper edge portion 28. Edge portion 28 thus forms a fulcrum, orthogonal to projection 22', about which thrust race 14 will be elastically bent in a later described step. The other wall 30 of die 26 terminates in outer straight edge portion 32 which leaves the unassembled approximately one-half of the roller cage and thrust race exposed. The semicircular shape of slot 24 holds the partially assembled roller cage and thrust race in the proper position relative to edge portion 28 once projection 22' is properly located. The width of slot 24 is sufficient to receive and loosely retain the partially assembled thrust race and roller cage without force.

Referring now to FIG. 2, a movable die member 34 has an edge portion 36 which is moved against the thrust race 14 near projection 22' to elastically deform thrust race 14 about the fulcrum provided by the edge portion 28 of die 26. The deformation moves the projection 22' axially and radially outwardly from its original dotted line position to a position where projection 22' is removed from the path followed by the other portion of rim 16 when it is moved in the next described step. As thrust race 14 is being bent or just thereafter, a spring biased plunger 38 engages roller cage 12 below projection 22' to move the other portion of rim 16 to a position which is below the FIG. 1 position of projection 22', indicated by dotted lines in FIG. 2. The pressure from plunger 38 may be applied before, during or after the elastic bending of thrust race 14. The pressure of plunger 38 on rim 16 is relatively light because rim 16 of the roller cage 12 need only tilt slightly relative to projection 22 to move the other portion of rim 16 within projection 22'.

Referring now to FIG. 3, die member 34 is returned to its FIG. 2 position, allowing thrust race 14 to self-straighten to its original position of FIG. 2. The light pressure from plunger 38 on rim 16 is maintained to prevent rim 16 from escaping past projection 22' until the self-straightening has been completed.

The distance from projection 22' to the orthogonal fulcrum provided by edge portion 28 will vary with the size of the bearing and the modulus of the elasticity of the material used. All tooling used is conventional and adaptable to either manual or automatic operation. If it is desired to construct thrust race 14 with groups of adjacent projections 22 rather than single projections as shown, each group should intercept only a small arc on axial flange 20 to obviate the necessity for excessive bending of the thrust race.

FIG. 5 shows a thrust bearing 10" having a roller cage 12" contained within the rim 16" of thrust race 14" by three symmetrically disposed projections 22", which are the same as projections 22 and 22'. The method of this invention may be used to assemble bearing 10" substantially as hereinbefore described except that the roller cage is initially placed inside two of the projections 22".

Thus the invention provides an improved method for assembling roller cages within preformed retaining projections on thrust races.

The embodiments of the invention in which an exclusive property or privilege is claimed are defined as follows:

1. A method for assembling a thrust bearing roller cage with an outer circular rim and a thrust race having an outer axial flange including a plurality of preformed symmetrically disposed radially inward rigid projections which retain the cage within the thrust race, comprising, placing one portion of the outer circular rim of the roller cage to one side of all but one of the projections and the diametrically opposed other portion of the rim to the other side of the one projection of the thrust race, elastically bending the thrust race and the one projection about a fulcrum orthogonal to the one projection to move the one projection from the original position to a displaced position axially and radially outwardly of the other portion of the rim, moving the other portion of the rim to a position to the one side of the original position of the one projection, and releasing the thrust race to self-straighten and return the one projection to the original position to retain the other portion of the rim to the one side thereof.

2. A method for assembling a thrust bearing roller cage with an outer circular rim within a plurality of preformed symmetrically disposed radially inward projections on the outer axial flange of a thrust race, comprising, locating one portion of the outer circular rim of the outer cage within all but one of the projections while leaving the other portion of the rim outside the one other projection of the thrust race, biasing the roller cage at a point proximate the other portion of the rim toward the thrust race, elastically bending the thrust race about a fulcrum orthogonal to the one other projection to move such projection radially and axially to a position permitting the other portion of the rim to move past such projection, and allowing the thrust race to self-straighten and return the other projection to the original position to retain the other portion of the rim therewithin.

* * * * *